United States Patent [19]

Hirose et al.

[11] Patent Number: 4,463,115

[45] Date of Patent: Jul. 31, 1984

[54] PRESSURE SENSITIVE ADHESIVE COMPOSITION

[75] Inventors: Toshifumi Hirose; Katsuhiko Isayama, both of Kobe, Japan

[73] Assignee: Kanegafuchi Kagaku Kogyo Kabushiki Kaisha, Osaka, Japan

[21] Appl. No.: 539,953

[22] Filed: Oct. 7, 1983

[30] Foreign Application Priority Data

Oct. 15, 1982 [JP] Japan ................................. 57-181843

[51] Int. Cl.$^3$ ........................... C08K 5/54; C08K 5/15; C08L 71/02; C08G 65/32
[52] U.S. Cl. ..................................... 524/188; 524/77; 524/187; 524/270; 524/798; 525/403; 525/523
[58] Field of Search ................. 524/187, 188, 77, 270, 524/798; 525/403, 523

[56] References Cited

U.S. PATENT DOCUMENTS

| | | | |
|---|---|---|---|
| 3,268,464 | 8/1966 | Suter | 524/270 |
| 4,092,465 | 5/1978 | Uraneck et al. | 524/188 |
| 4,113,691 | 9/1978 | Ward | 525/523 |
| 4,133,789 | 1/1979 | Takshmanan | 524/188 |
| 4,136,080 | 1/1979 | Berger | 524/188 |
| 4,243,767 | 1/1981 | Kaufman et al. | 525/403 |
| 4,284,548 | 8/1981 | Kaufman et al. | 525/403 |

FOREIGN PATENT DOCUMENTS 455131  3/1975  U.S.S.R. ............................. 524/188

Primary Examiner—H. S. Cockeram
Attorney, Agent, or Firm—Antonelli, Terry & Wands

[57] ABSTRACT

A pressure sensitive adhesive composition comprising (A) a polyether having at least one silicon-containing hydrolyzable group, having an average molecular weight of 300 to 30,000 and having a principal chain which is essentially constructed with the chemically bonded recurring units:

$$-R^1-O-$$

wherein $R^1$ is a divalent alkylene group and (B) a tackifier; said tackifier being admixed with the polyether in an amount of 10 to 140 parts by weight per 100 parts by weight of said polyether. From the composition a pressure sensitive adhesive product having good adhesive properties can be prepared substantially without a solvent.

7 Claims, No Drawings

PRESSURE SENSITIVE ADHESIVE COMPOSITION

BACKGROUND OF THE INVENTION

The present invention relates to a pressure sensitive adhesive composition which can be cured on a backing to become a rubber-like material, more particularly relates to a pressure sensitive adhesive composition mainly comprising a polyether having at least one silicon-containing hydrolyzable group and a tackifier.

Hitherto, a pressure sensitive adhesive product such as a pressure sensitive adhesive tape, label or sheet is generally prepared by uniformly dissolving a natural rubber or an acryl polymer which contains a tackifier, a plasticizer and an antioxidant in an organic solvent (solid content: about 20 to about 35%), applying the solution to a body material such as a paper or a plastic film, and then heating the solution to evaporate and remove the solvent. The conventional process has defects that the step for removing a large amount of the solvent requires a high thermal energy cost for the evaporation of the solvent and an additional cost for the recovering installation, and further that there are problems concerning working environment, prevention of disaster and pollution.

Though an acryl emulsion pressure sensitive adhesive and a hot melt pressure sensitive adhesive are prepared as a non-solvent pressure sensitive adhesive in order to resolve the above-mentioned problems, the former has a decreased water resistance and an odor of acrylic acid, and the latter has a decreased heat resistance and a problem on tack.

An object of the invention is to provide an odorless pressure sensitive adhesive composition which has an excellent pressure sensitive adhesibility, water resistance and heat resistance, and can be easily applied without or with little amount of solvent.

SUMMARY OF THE INVENTION

In accordance with the present invention, there is provided a pressure sensitive adhesive composition mainly comprising a polyether having at least one silicon-containing hydrolyzable group and a tackifier.

The polyether has at least one silicon-containing hydrolyzable group and has an average molecular weight of 300 to 30,000. The principal chain of the polyether is essentially constructed with the chemically bonded recurring units:

$$-R^1-O-$$

wherein $R^1$ is a divalent alkylene group.

The tackifier is admixed with the polyether in an amount of 10 to 140 parts (parts by weight, hereinafter the same) per 100 parts of the polyether.

The compositin of the invention is flowable at room temperature and is cured to become a rubber-like material having an excellent pressure sensitive adhesibility.

DETAILED EXPLANATION OF THE INVENTION

The polyether having at least one silicon-containing hydrolyzable group may be prepared and disclosed, for example, in the Japanese Patent Examined Publication (Tokkyo Kokoku) Nos. 36319/1970, 12154/1971 and 32673/1974 and the Japanese Patent Unexamined Publication (Tokkyo Kokai) Nos. 156599/1975, 73561/1976, 6096/1979, 13767/1980, 13768/1980, 82123/1980, 123620/1980, 125121/1980, 131021/1980, 131022/1980, 135135/1980 and 137129/1980. The polyether can provide a material having a high rate of elongation by curing.

The silicon-containing hydrolyzable group can exist at a side chain or an end of the polyether. It is preferable to introduce the silicon-containing hydrolyzable group at an end of the principal chain from viewpoints of preparation and properties of the product.

Preferable examples of the silicon-containing hydrolyzable groups include, for instance, a silicon atom which is chemically bonded to hydrogen atom, a halogen atom, an alkoxy group, an acyloxy group, a ketoxymate group, an amino group, an amide group, an aminoxy group, an alkenyloxy group or a mercapto group. Particularly preferable silicon-containing hydrolyzable groups are represented by the general formula:

wherein $R^3$ is a monovalent hydrocarbon group having 1 to 12 carbon atoms selected from an alkyl group and an aryl group, X is hydrogen atom, a halogen atom, or a group selected from an alkoxy group, an acyloxy group, a ketoxymate group, an amino group, an amido group, an aminoxy group, an alkenyloxy group and a mercapto group, "a" is 0, 1 or 2. It is preferred that X is an alkoxy group, particularly methoxy.

The most preferable silicon-containing hydrolyzable group is represented by the general formula:

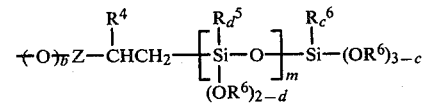

wherein Z is

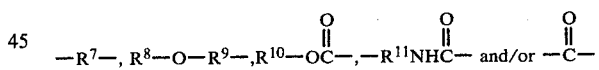

in which $R^7$, $R^8$, $R^9$, $R^{10}$ and $R^{11}$ are the same or different and each is a divalent hydrocarbon group having 1 to 20 carbon atoms, $R^4$ is hydrogen atom, a triorganosiloxy group or a substituted or unsubstituted monovalent organic group having 1 to 20 carbon atoms, $R^5$ is an organosiloxy group or a substituted or unsubstituted monovalent organic group having 1 to 20 carbon atoms, $R^6$ is a saturated or unsaturated monovalent hydrocarbon group having 1 to 20 carbon atoms, "b" is 0 or 1, "c" is 0, 1 or 2, "d" is 0, 1 or 2, and "m" is 0 or an integer of 1 to 18. It is preferable that $R^6$ is methyl.

The principal chain of the polyether essentially has the recurring units represented by $-R^1-O-$ wherein $R^1$ is a divalent alkylene group, preferably a divalent alkylene group having 1 to 4 carbon atoms, most preferably a polyoxypropylene group.

The term "essentially" as mentioned above means that the principal chain may include monomer units and/or polymer units other than $-R^1-O-$. In general, the principal chain preferably includes the recurring unit of $-R^1-O-$, wherein $R^1$ is preferably a hydrocarbon group having 1 to 4 carbon atoms, of at least 80% by weight of the principal chain.

The polyether employed in the present invention may be a linear or branched polymer or an admixture thereof. An average molecular weight of the polyether is 300 to 30,000, preferably 3,000 to 15,000. The polyether is an odorless liquid polymer at normal temperature and is cured in the presence of water to become a rubber-like material.

The tackifier used in the present invention should be compatible with the polyether. Examples of the tackifiers are, for instance, a rosin resin such as rosin, a rosin ester or a hydrogenated rosin ester; a phenol resin; a modified phenol resin such as a terpen-phenol resin; a xylene resin; an aliphatic petroleum resin; an aromatic petroleum resin; a terpen resin; a cumarone resin; and the like. Preferable results can be obtained by using a rosin ester, a hydrogenated rosin ester, a phenol resin, a terpen-phenol resin, a xylene resin or a xylene-phenol resin from a compatible point of view.

The tackifier is employed in an amount of 10 to 140 parts, preferably 20 to 120 parts per 100 parts of the polyether. When the amount of the tackifier is less than 10 parts the tack and the adhesive strength of the product are not enough as a pressure sensitive adhesive, while when the amount of the tackifier is more than 140 parts, the curing rate of the polyether becomes low and the adhesive remains on an adherend after peeling the adhesive product.

In accordance with the present invention, a pressure sensitive adhesive product can be prepared from the adhesive composition of the invention substantially without or with little amount of a solvent. Accordingly, the tackifier is not dissolved in the rubber polymer component (polyether) by using a large amount of a solvent, but is directly dissolved in the polymer component or is dissolved with a kneading machine such as a kneader or a three-roll paint mill by using a very small amount of a solvent.

A composition prepared from the polyether having the silicon-containing hydrolyzable group without adding the tackifier has a low tack and a low adhesive strength. Though the tack and the adhesive strength can be improved a little by controlling the content of the silicon-containing hydrolyzable group, the results are not yet satisfactory.

To the composition of the present invention a silanol condensation catalyst may be added for accelerating the curing reaction caused by condensation of the silicon-containing hydrolyzable group of the polyether. Examples of the silanol condensation catalysts are, for instance, a metal salt of a carboxylic acid such as dibutyl tin dilaurate, tin dioctylate, dioctyl tin maleate; a reaction product of dibutyl tin oxide and a phthalate; an alkyl titanate; an amine; an acidic catalyst; a basic catalyst; and the like. The catalyst is employed in an amount of 0.1 to 5 parts per 100 parts of the polyether. When the amount of the catalyst is less than 0.1 part a satisfactory catalytical action cannot be obtained, while when the amount is more than 5 parts a curing rate of the polyether becomes too high to exert a baneful influence upon the application to a backing.

The composition of the invention may optionally include, if necessary, a plasticizer, a softening agent, a filler, an antioxidant, an ultra-violet absorbent, a pigment and a surfactant. Examples of the plasticizers are, for instance, dioctyl phthalate, butylbenzyl phthalate, polypropylene glycol, chlorinated paraffin, liquid polybutadiene, and the like. Examples of the fillers are, for instance, calcium carbonate, kaoline, talc, titanium dioxide, zinc oxide, silica, silicious earth, barium sulfate, and the like.

The composition of the invention may also include a silicon-containing hydrolyzable compound having a low molecular weight such as tetraethyl ortho-silicate, methyltrimethoxysilane or vinyltrimethoxysilane; an alcohol such as methanol or ethanol; a $\beta$-diketone such as acetylacetone or ethyl acetoacetate. Those compounds are added for extending a pot life of the composition.

The pressure sensitive adhesive composition of the present invention does not essentially need any solvent, but for adjusting a viscosity of the composition an employment of a little amount of a solvent is allowable.

A pressure sensitive adhesive product can be produced from the composition of the invention according to the following non-limiting processes.

An example of the process is a process in which the tackifier and, if necessary, a plasticizer, a filler, an antioxidant and the like are added to the polyether in an optional amount and are uniformly dissolved in the polyether by kneading with a kneading machine such as a Banbury mixer, a kneader or a three-roll paint mill. After uniformly admixing a catalyst with the composition, the obtained liquid composition is uniformly applied to a surface of a backing with a coater, and the composition is cured for 30 seconds to 5 minutes at a temperature of room temperature to 150° C., and then the product having the cured composition is rolled around a reel. Other than the above process, there are employed a process in which a catalyst is precedingly applied on a backing and a process in which a catalyst or water is sprayed to the composition applied on a backing. Those processes are available for mass production from a viewpoint of viscosity stability of the composition.

As the backing employed in the present invention, any conventional backing can be employed. Examples of the backing are, for instance, a kraft paper, a Japanese paper, a staple cloth, a cotton cloth, a cellophane film, a soft polyvinylchloride film, a polypropylene film, a polyethylene film, a polyester film, a glass cloth, and the like. A material treated by corona surface treatment or primer surface treatment may be employed as a backing. The backing is cut into a form of a tape, a sheet or a label depending on its use.

The present invention is more specifically described and explained by means of the following Examples in which all percents are by weight unless otherwise noted. It is to be understood that the present invention is not limited to the Examples, and various changes and modification may be made in the invention without departing from the spirit and scope thereof.

REFERENCE EXAMPLE 1

A pressure vessel of 1 l having a stirrer was charged with 320 g of a polyoxypropylene glycol having an average molecular weight of 3,200 (the end functional groups of which consist of 15% of an allyl ether group, 3% of propenyl ether group and 82% of hydroxyl group) under nitrogen gas atmosphere. To the polymer 40.8 g of caustic soda powder (purity: 98%) was added, and then the temperature in the vessel was raised to 60° C. After adding 7.76 g of bromochloromethane, the reaction was carried out for 10 hours at 60° C. Then the temperature of the reaction system was lowered to 50°

C. and 9.2 g of an allylchloride was added. The reaction was continuously carried out for 10 hours at 50° C. After the completion of the reaction, the reaction mixture was taken out of the vessel to a beaker, diluted with 1,000 g of n-hexane and treated with 50 g of aluminum silicate by stirring for one hour at normal temperature. After filtering the mixture and washing the remaining cake with n-hexane several times, volatile components were distilled off from the filtrate to give 300 g of propenyloxide polymer having an average molecular weight of 8,000. The end functional groups consist of 90% of the allyl ether group, 8% of propenyl ether group and 2% of hydroxyl group.

A pressure vessel of 500 ml having a stirrer was charged with 84 g of the thus obtained polymer. To the polymer was added 2.1 g of methyldimethoxysilane and 0.05 ml of a catalyst solution of chloroplatinic acid prepared by dissolving 2 g of $H_2PtCl_6 \cdot H_2O$ in 20 ml of isopropanol and 78 ml of tetrahydrofuran. After carrying out the reaction for 8 hours at 100° C., volatile components were removed from the reaction mixture to give the alkyleneoxide polymer. Eighty two percents of the end groups of the polymer was the group represented by the formula:

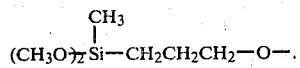

EXAMPLE 1

To 100 parts of the polyether (average molecular weight: 8,200) having the silicon-containing hydrolyzable group obtained in Reference Example 1 was added and dissolved 333 parts of 30% toluene solution of the tackifier shown in Table 1. The obtained uniform solution was thinly applied to a glass plate, and after evaporating toluene the compatibility of the tackifier with the polyether and the pressure sensitive adhesibility of the composition were measured. The results are shown in Table 1.

In Table 1, Ester PE, Tespol SPR 110 and Hitanol PR 260S are available from Tokushima Seiyu Co., Ltd., Japan; Pencell A, Ester gum H, Ester gum Hp, Arkon P-90, Tamanol 100S and Tamanol 350 are available from Arakawa Chemical Industries Co., Ltd. Japan; YS Polystar T-80, YS Polystar T-130, YS Resin A-800 and YS Resin Dx-1000 are available from Yasuhara Yushi Kogyo Co., Ltd., Japan; Hiresin #70 is available from Toho Chemical Industry Co., Ltd., Japan; Nikanol H is available from Mitsubishi Gas Chemical Co., Ltd.

The compatibility was estimated by observing a degree of haze with naked eyes.
○: No haze was observed.
Δ: Light spots were observed.
X: Spots were clearly observed.
XX: Cloudiness was observed all over the composition.

The pressure sensitive adhesibility was estimated by measuring the tackiness by means of touch.
○: Great tackiness
Δ: A little tackiness
X: Less tackiness

TABLE 1

| Tackifier | | Compatibility | pressure sensitive adhesibility |
|---|---|---|---|
| Kinds | Commercial name | | |
| Rosin ester | Ester PE | ○ | ○ |
| | Pencell A | ○ | ○ |
| Hydrogenated rosin ester | Ester gum H | ○ | ○ |
| | Ester gum H | ○ | Δ |
| Terpen-phenol resin | YS Polystar T-80 | ○ | ○ |
| | YS Polystar T-130 | ○ | ○ |
| Terpen resin | YS Resin A-800 | X | X |
| | YS Resin Dx-1000 | X | X |
| Petrolium resin | Hiresin 70 | X | X |
| | Arkon P-90 | X | X |
| Phenol resin | Tamanol 100S | ○ | ○ |
| Modified Phenol resin | Tamanol 350 | ○ | X |
| | Tespol SPR100 | Δ | Δ |
| | Hitanol PR260S | ○ | X |
| Xylene resin | Nikanol H | ○ | ○ |

As is clear from Table 1, the rosin ester, the hydrogenated rosin ester, the terpen-phenyl resin, the phenol resin and the xylene resin have a good compatibility with the polyether and exhibit an excellent pressure sensitive adhesibility.

EXAMPLE 2

On the basis of the results of Example 1, the tackifier having a good compatibility was dissolved in the polyether obtained in Reference Example 1 by kneading with a three-roll paint mill without any solvent. The compatibility of the tackifier with the polyether was measured in the same manner as in Example 1. As a result, the following tackifier could be uniformly dissolved in the polyether without using any solvent to give a transparent solution and the good compatibility of the tackifier with the polyether was confirmed.

The employed tackifiers are Ester PE and Pencell A (rosin ester), Ester gum H and Ester gum Hp (hydrogenated rosin ester), YS Polystar T-80 and YS Polystar T-130 (terpen-phenol resin), Tamanol 100S (phenol resin) and Nikanol H (xylene resin).

EXAMPLE 3

To 100 parts of the polyether (average molecular weight: 8,200) having the silicon-containing hydrolyzable group obtained in Reference Example 1 were added and admixed 90% toluene solution of the tackifier shown in Table 2 in verious amounts shown in the same Table, and then the catalyst was added thereto to prepare the pressure sensitive adhesive composition.

The resulting composition was applied with a coater on a polyester film having a thickness of 25 μm so as to give a dry composition of 25 μm in thickness. After heating for 5 minutes at 80° C., a test piece was prepared. The results of the following pressure sensitive adhesive properties of the obtained adhesive sheet are shown in Table 2.

The tack was estimated according to the J. Dow type ball tack measuring method.
Temperature: 30° C.
Inclination: 30° C.
Ball diameter: 1/32 to 32/32, every 1/32 inch, the results are represented with ball No., for instance, ball No. 1 has a diameter of 1/32 inch and ball No. 32 has a diameter of 32/32 inch.

The adhesive strength was measured according to the Japanese Industrial Standards (JIS)-Z-1522.
Measuring temperature: 23° C.

Adherend: Stainless steel plate
Tensile rate: 300 mm/min (180° peeling off)
The holding power was measured according to the JIS-Z-1524.

Measuring temperature: 30° C.
Adherend: Stainless steel plate
Adhesion area: 25 mm×25 mm
Load: 1 kg
Measuring period: 15 min

TABLE 2

| Tackifier | Parts | Tack | Adhesive strength (g/cm$^2$) | Holding power (mm) | Note |
|---|---|---|---|---|---|
| Ester PE (rosin ester) | 11 | 12 | 70 | 0 | |
| | 25 | 16 | 230 | 0 | |
| | 43 | 22 | 280 | 0 | |
| | 67 | 20 | 360 | 0 | |
| | 100 | 30 | 490 | 0 | |
| | 122 | 28 | 420 | 0 | |
| | 150 | 7 | 280 | immediately droped | unsatisfactory curing |
| YS Polystar T-115 (terpen-phenol resin) | 11 | 7 | 70 | 0 | |
| | 25 | 8 | 180 | 0 | |
| | 43 | 14 | 260 | 0 | |
| | 67 | 20 | 440 | 0 | |
| | 100 | 20 | 560 | 0 | |
| | 122 | 16 | 330 | 0.1 | |
| | 150 | 7 | 220 | immediately droped | unsatisfactory curing |
| Tamanol 100S (phenol resin) | 11 | 18 | 65 | 0 | |
| | 25 | 20 | 100 | 0 | |
| | 43 | 24 | 255 | 0 | |
| | 67 | 30 | 690 | 0 | |
| | 100 | 30 | 750 | 0 | |
| | 122 | 30 | 350 | 3.0 | |
| | 150 | 30 | 230 | immediately droped | unsatisfactory curing |

As is clear from Table 2, the pressure sensitive adhesive product having a good adhesive properties can be obtained by adding the rosin ester, the terpen-phenol resin or the phenol resin in an amount of 10 to 140 parts to 100 parts of the polyether having the silicon-containing hydrolyzable group.

REFERENCE EXAMPLE 2

The procedures of Reference Example 1 were repeated except using 2.2 g of trimethoxysilane instead of 2.1 g of methyldimethoxysilane. Eighty percents of the end groups of the obtained alkylene oxide polymer was the group represented by the formula:

(CH$_3$O)$_3$SiCH$_2$CH$_2$CH$_2$—O—.

EXAMPLE 4

The procedures of Example 3 were repeated except using the polyether prepared in Reference Example 2 and the hydrogenated rosin ester. The adhesive properties of the obtained test pieces were measured in the same manner as in Example 3. The results are shown in Table 3.

TABLE 3

| Tackifier | Parts | Tack | Adhesive strength (g/cm$^2$) | Holding power (mm) | Note |
|---|---|---|---|---|---|
| Ester gum H (hydrogenated rosin ester) | 11 | 5 | 70 | 0 | |
| | 25 | 6 | 180 | 0 | |
| | 43 | 12 | 240 | 0 | |
| | 67 | 20 | 350 | 0 | |
| | 100 | 14 | 470 | 0 | |
| | 122 | 12 | 390 | 0 | |
| | 150 | 7 | 200 | immediately droped | unsatisfactory curing |

REFERENCE EXAMPLE 3

The procedures of Reference Example 1 were repeated except using 1.3 g of methyldimethoxysilane instead of 2.1 g of methyldimethoxysilane. Fifty five percents of the end groups of the obtained alkylene oxide polymer was the group represented by the formula:

(CH$_3$O)$_2$Si(CH$_3$)—CH$_2$CH$_2$CH$_2$—O—.

COMPARATIVE EXAMPLE

The comparative pressure sensitive adhesive product was prepared from the polyether obtained in each Reference Examples 1 to 3 without adding any tackifier. The adhesive properties of the comparative products are shown in Table 4.

TABLE 4

| Polymer | Tack | Adhesive strength (g/cm$^2$) | Holding power (mm) |
|---|---|---|---|
| Polymer of Ref. Ex. 1 | 3 | 20 | 0 |
| Polymer of Ref. Ex. 2 | 3 | 25 | 0 |
| Polymer of Ref. Ex. 3 | 5 | 45 | 0 |

As is clear from Table 4, the comparative products without any tackifier are decreased in tack and adhesive strength and are not good for use as a pressure sensitive adhesive.

In addition to the ingredients used in the Examples, other ingredients can be used in the Examples as set forth in the specification to obtain substantially the same results.

What we claim is:

1. A pressure sensitive adhesive composition comprising (A) a polyether having at least one silicon-containing hydrolyzable group, having an average molecular weight of 300 to 30,000 and having a principal chain which is essentially constructed with the chemically bonded recurring units:

—R$^1$—O— wherein R$^1$ is a divalent alkylene group and (B) a tackifier; said tackifier being admixed with the polyether in an amount of 10 to 140 parts by weight per 100 parts by weight of said polyether.

2. The composition of claim 1, wherein said tackifier is a member selected from the group consisting of a rosin ester, a hydrogenated rosin ester, a terpen-phenol resin, a phenol resin, a xylene resin and a xylene-phenol resin.

3. The composition of claim 1, wherein said principal chain of the polyether is an oxyalkylene polymer which is essentially constructed with the recurring units:

$$-R^2-O-$$

wherein $R^2$ is a divalent alkylene group having 1 to 4 carbon atoms.

4. The composition of claim 3, wherein said polyether has an average molecular weight of 3,000 to 15,000.

5. The composition of claim 4, wherein said principal chain of the polyether is essentially a polyoxypropylene.

6. The composition of claim 1, wherein said silicon-containing hydrolyzable group is an alkoxysilyl group.

7. The composition of claim 6, wherein said silicon-containing hydrolyzable group is methoxysilyl.

* * * * *